(12) United States Patent
Andersson et al.

(10) Patent No.: US 10,774,712 B2
(45) Date of Patent: Sep. 15, 2020

(54) INTERNAL COMBUSTION ENGINE SYSTEM AND AN EXHAUST TREATMENT UNIT FOR SUCH A SYSTEM

(71) Applicant: VOLVO TRUCK CORPORATION, Gothenburg (SE)

(72) Inventors: Lennart Andersson, Varberg (SE); Arne Andersson, Mölnlycke (SE); Bengt Johansson, Lund (SE); Nhut Lam, Bjuv (SE); Staffan Lundgren, Hindås (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 19 days.

(21) Appl. No.: 16/060,968

(22) PCT Filed: Dec. 14, 2015

(86) PCT No.: PCT/EP2015/079582
§ 371 (c)(1),
(2) Date: Jun. 11, 2018

(87) PCT Pub. No.: WO2017/101967
PCT Pub. Date: Jun. 22, 2017

(65) Prior Publication Data
US 2018/0363526 A1    Dec. 20, 2018

(51) Int. Cl.
*F01N 3/20* (2006.01)
*F02B 33/20* (2006.01)
(Continued)

(52) U.S. Cl.
CPC ......... *F01N 3/2006* (2013.01); *F01N 3/2066* (2013.01); *F02B 29/04* (2013.01);
(Continued)

(58) Field of Classification Search
CPC .. F01N 3/2006; F01N 3/2066; F01N 2240/02; F02B 33/20; F02B 33/443; F02B 37/105; F02G 3/02
See application file for complete search history.

(56) References Cited

U.S. PATENT DOCUMENTS

| 2,255,925 A | 9/1941 | Heylandt | |
| 2,404,395 A * | 7/1946 | Milliken | F02G 3/02 60/39.511 |

(Continued)

FOREIGN PATENT DOCUMENTS

| CN | 102155290 B | 8/2011 | |
| EP | 2098696 A1 * | 9/2009 | F01K 23/065 |

(Continued)

OTHER PUBLICATIONS

Communication Under Rule 71(3) EPC from corresponding European App. 15816708.0 (dated Jun. 21, 2019) (citing U.S. Pat. No. 2,255,925 at p. 5).

(Continued)

*Primary Examiner* — Mark A Laurenzi
*Assistant Examiner* — Jessica L Kebea
(74) *Attorney, Agent, or Firm* — Venable LLP; Jeffri A. Kaminski

(57) ABSTRACT

An internal combustion engine system includes a compressor arranged to compress air, at least one combustor, at least one of the at least one combustor being arranged to receive the compressed air, and an exhaust treatment device arranged to process exhaust gases produced by at least one of the at least one combustor, a heat exchanger arranged to receive the compressed air from the compressor before it reaches the at least one of the at least one combustor, and wherein the heat exchanger is arranged to transfer heat from the compressed air to the exhaust treatment device.

24 Claims, 5 Drawing Sheets

(51) Int. Cl.
*F02B 33/44* (2006.01)
*F02B 37/10* (2006.01)
*F02B 41/06* (2006.01)
*F02G 3/02* (2006.01)
*F02B 29/04* (2006.01)

(52) U.S. Cl.
CPC .............. *F02B 33/20* (2013.01); *F02B 33/44* (2013.01); *F02B 33/443* (2013.01); *F02B 37/105* (2013.01); *F02B 41/06* (2013.01); *F02G 3/02* (2013.01); *F01N 2240/02* (2013.01); *Y02A 50/2325* (2018.01); *Y02T 10/144* (2013.01); *Y02T 10/24* (2013.01); *Y02T 10/26* (2013.01)

(56) References Cited

U.S. PATENT DOCUMENTS

| | | | |
|---|---|---|---|
| 4,133,172 A | | 1/1979 | Cataldo |
| 4,653,269 A | * | 3/1987 | Johnson .................... F02G 1/00 60/39.63 |
| 5,603,215 A | * | 2/1997 | Sung .................... B01D 53/944 60/274 |
| 5,753,188 A | | 5/1998 | Shimoda et al. |
| 6,092,365 A | * | 7/2000 | Leidel ....................... F02G 3/02 60/39.63 |
| 6,321,552 B1 | * | 11/2001 | Frederiksen ............. B60H 1/32 123/41.23 |
| 7,210,469 B1 | * | 5/2007 | Saele .................... F01N 3/0205 123/568.12 |
| 7,607,301 B2 | * | 10/2009 | Harada ............... F02B 29/0406 123/568.12 |
| 8,371,256 B2 | | 2/2013 | Durrett et al. |
| 8,596,063 B2 | * | 12/2013 | Brown .................... F01N 3/035 60/274 |
| 8,828,342 B1 | * | 9/2014 | Tyo ....................... F01N 3/2053 423/213.2 |
| 2003/0228237 A1 | * | 12/2003 | Holtzapple ............... F01C 1/10 418/171 |
| 2007/0089716 A1 | | 4/2007 | Saele |
| 2008/0178577 A1 | * | 7/2008 | Ruckwied ............. F01N 3/2889 60/278 |
| 2009/0272368 A1 | | 11/2009 | Branyon et al. |
| 2010/0043428 A1 | * | 2/2010 | Stablein .................. F01N 3/025 60/602 |
| 2011/0051743 A1 | | 3/2011 | Chen |
| 2012/0036850 A1 | * | 2/2012 | Ernst ..................... F01K 23/065 60/615 |
| 2012/0103314 A1 | * | 5/2012 | Jackson .................. F02B 41/06 123/70 R |
| 2012/0144804 A1 | * | 6/2012 | Mendez ................ F01N 3/2006 60/274 |
| 2012/0260627 A1 | | 10/2012 | Durrett et al. |
| 2013/0340730 A1 | * | 12/2013 | Fischer ............... F02B 29/0406 123/568.12 |
| 2018/0016997 A1 | * | 1/2018 | Snyder ...................... F01N 5/04 |
| 2018/0038324 A1 | * | 2/2018 | Gessier ............ F02M 35/10268 |

FOREIGN PATENT DOCUMENTS

| | | | |
|---|---|---|---|
| GB | 401239 A | * 11/1933 | .............. F02B 37/04 |
| JP | 2008-25564 A | 8/2009 | |
| WO | 0006876 A1 | 2/2000 | |
| WO | 0175290 A1 | 10/2001 | |
| WO | 2004001206 A1 | 12/2003 | |
| WO | 2012021102 A1 | 2/2012 | |
| WO | 2015086935 A1 | 6/2015 | |
| WO | WO-2015086905 A1 | * 6/2015 | |

OTHER PUBLICATIONS

International Search Report (dated Nov. 11, 2016) for corresponding International App. PCT/EP2015/079582.
Office Action dated Mar. 12, 2020 in corresponding CN Application No. 201580085299.8, 11 pages.

* cited by examiner

INTERNAL COMBUSTION ENGINE SYSTEM AND AN EXHAUST TREATMENT UNIT FOR SUCH A SYSTEM

BACKGROUND AND SUMMARY

The invention relates to an internal combustion engine system and an exhaust treatment unit for such a system.

The invention can be applied in heavy-duty vehicles, such as trucks, buses and construction equipment, e.g., working machines. The invention can also be applied to cars. Although the invention will be described with respect to a truck, the invention is not restricted to this particular vehicle type.

It is known that internal combustion engines with two stages of compression and two stages of expansion, e.g. by a compressor, a combustor and an expander, may provide for reaching very high pressures and for extracting more energy from the fuel. An example of such an engine is disclosed in U.S. Pat. No. 8,371,256. It is suggested therein that upon exiting an expander cylinder, the engine exhaust gases might be routed to an exhaust gas after treatment system. However, a highly efficient vehicle engine may have very cool tailpipe exhaust, which may prevent or reduce the efficiency of exhaust treatment processes provided by exhaust treatment devices such as catalytic converters of various types. For certain processes, e.g. selective catalytic reduction (SCR), it is possible to compensate for low temperatures by providing large exhaust treatment devices; however, this will increase the weight and volume of the engine system, which may be a problem, particularly in vehicles, where often there are demanding space requirements.

It is desirable to reduce emissions from a highly efficient internal combustion engine. It is also desirable to provide a highly efficient internal combustion engine system, which provides an effective treatment of exhaust gases, while avoiding large increases of the volume and/or weight of the engine system.

According to an aspect of the invention, an internal combustion engine system is provided comprising a compressor arranged to compress air, at least one combustor, at least one of the at least one combustor being arranged to receive the compressed air, and an exhaust treatment device arranged to process exhaust gases produced by at least one of the at least one combustor, characterized in that the system comprises a heat exchanger arranged to receive the compressed air from the compressor before it reaches the at least one of the at least one combustor, and that the heat exchanger is arranged to transfer heat from the compressed air to the exhaust treatment device.

The heat exchanger being arranged to transfer heat to the exhaust treatment device provides a solution to the problem of exhaust gas temperatures being too low for an effective exhaust treatment process. By drawing heat from the compressed air, and transferring this heat to the exhaust treatment device, the temperature of the exhaust treatment device may be increased to improve the process therein. Also, the invention makes it possible to avoid the need to compensate for low temperatures by increasing the size of the exhaust treatment device, and thereby increasing the weight and volume of the engine system.

It should be noted that the engine system may comprise more a plurality of compressors, combustors, and heat exchangers and exhaust treatment devices. Thereby, separate groups of the combustors may be each arranged to receive compressed air from a respective of the compressors. It should be noted in particular that a combustor which is arranged to receive the compressed air from a particular compressor, may or may not be a combustor which produces exhaust gases which a particular exhaust treatment device processes.

The invention is particularly advantageous where the engine system comprises an expander arranged to receive the exhaust gases from the at least one of the at least one combustor, and to expand and extract energy from the exhaust gases, the exhaust treatment device being arranged to receive the exhaust gases from the expander. The high efficiency provided by the expander will bring the exhaust gas temperature to a relatively low level. However, by the heat exchanger being arranged to transfer heat from the compressed air to the exhaust treatment device, the exhaust gas temperature may be brought to a level which benefits the exhaust treatment device process. For example, the expander contributing to a highly efficient engine may result in exhaust gases in the range of 50-250° C. However, where the exhaust treatment device is a typical catalyst for NOx reduction, such a device may not work under 150° C. and may not become fully efficient until the temperature has reached 250° C. If the compressor compresses air e.g. to a temperature of around 260° C., the transfer of heat from the compressed air may bring the exhaust treatment device temperature up so as for the device to become fully efficient. It should be noted that in preferred embodiments, the heat exchanger is arranged to receive the exhaust gases from the expander.

Any suitable heat exchanger type may be used. The heat exchanger is preferably a counterflow heat exchanger. However, in some embodiments, the heat exchanger may be a parallel flow heat exchanger.

The invention is particularly advantageous where the system comprises a crankshaft, and the expander comprises a piston, and is arrange to drive the crankshaft, since a very effective expansion of the exhaust gases may thereby be provided, providing very low exhaust gas temperature. As mentioned, the invention provides for effectively running an exhaust treatment device despite such low exhaust gas temperature.

The system may comprise an oil separator arranged to receive exhaust gases from the expander, and to separate oil from the exhaust gases before the exhaust gases reach the exhaust treatment device. Thereby, oil introduced to the exhaust gases, e.g. by the expanders, will be removed therefrom, avoiding or reducing detrimental effects it may have on the heat exchanger and/or post-expander exhaust treatment device.

In some embodiments, the heat exchanger is arranged to transfer the heat to the exhaust treatment device via the exhaust gases. Thereby, where the heat exchanger is arranged to receive the exhaust gases, and the exhaust treatment device is arranged to receive the exhaust gases from the heat exchanger, the heat from the compressed air may the effectively transferred to the exhaust treatment device. The exhaust treatment device may be located in a path of the exhaust gases, downstream of the heat exchanger.

In some embodiments, a direct heat transfer is provided by the heat exchanger from the compressed air to the exhaust treatment device. The heat exchanger and the exhaust treatment device may be integrated. Thereby, the heat exchanger may comprise a wall separating the air and the exhaust gases, and the exhaust treatment device may comprise an exhaust treatment layer on an exhaust gas side of the wall. Thus, an exhaust gas part of the heat exchanger may be coated with the exhaust treatment layer. The exhaust treatment layer may be a catalyst.

The integration which reduces the total volume of the combination of the heat exchanger and the exhaust treatment device. Also, the integration enhances the heat transfer, and may therefore serve to reduce the time to a "working catalyst" during a cold start procedure of the engine system. It should be noted that whilst the exhaust treatment device is arranged to receive the exhaust gases, the heat exchanger itself may or may not be arranged to receive the exhaust gases.

Preferably, said wall of the heat exchanger presents a plurality of protruding flanges on an air side of the wall. Such flanges will enhance the absorption of the wall of heat from the compressed air, for transfer of the heat to the exhaust treatment layer.

It should be noted that in some embodiments, the exhaust treatment device may comprise a first portion which is integrated with the heat exchanger and a second portion which is arranged to receive heat from the compressed air via exhaust gases received from the heat exchanger. Thereby an effective use of the heat exchanger and a beneficial distribution of the exhaust treatment device may be provided. The first portion may comprise an exhaust treatment layer on the exhaust gas side of the wall the heat exchanger, separating the air and the exhaust gases, and the second portion may comprise a further exhaust treatment element located in a path of the exhaust gases, downstream of the heat exchanger.

Said first portion of the exhaust treatment device may be an oxidation catalyst arranged to convert at least a portion of nitrogen monoxide (NO) to nitrogen dioxide (NO2), and to oxidize oil and hydrocarbons (HC). The second portion may be an SCR catalyst. An injector may be arranged to inject reductant for the SCR catalyst between the first and second portions. In other embodiments the first portion may be an SCR catalyst and the second portion may be a further SCR catalyst. Thereby, an injector may be arranged to inject reductant upstream of the first portion, preferably in the vicinity of or into the expander. Regardless of whether the first and second portions are oxidation and SCR catalysts, respectively, or whether both portions are SCR catalysts, a coating of an ammonia slip catalyst (ASC) is preferably provided in the end of the second portion.

The invention is particularly beneficial where the exhaust treatment device comprises an oxidation catalyst, and/or a selective catalytic reduction (SCR) catalyst. Such catalysts may need a minimal exhaust gas temperature to work efficiently, and this is provided by the heat exchanger being arranged to transfer heat from the compressed air to the exhaust treatment device.

Where the exhaust treatment device comprises an SCR catalyst, the system preferably comprises an injector arranged to inject reductant for the SCR catalyst, upstream of the heat exchanger. Thereby, where the SCR catalyst is located downstream of the, such an arrangement of the injector may provide a good mixing of the reductant with the exhaust gases, before reaching the SCR catalyst.

Preferably, where the system comprises an expander arranged to receive the exhaust gases from the at least one of the at least one combustor, and to expand and extract energy from the exhaust gases, the exhaust treatment device is arranged to receive the exhaust gases from the expander, and the system comprises an injector arranged to inject the reductant for the SCR catalyst, upstream of the expander or into the expander.

Thereby, a particularly good mixing of the reductant with the exhaust gases may be provided. The injectors are preferably controllable by a control unit of the engine system, to control the timing, the flow and the duration of the redundant injections. Specifically, the timing and duration of the reductant injections may be coordinated with the actuations of one or more expander inlet valves, in order to enable good mixing of the reductant with the exhaust gases in the expander.

Preferably, the system is arranged so that during an operation thereof, the exhaust treatment device presents a temperature above 150° C., above preferably 250° C. As suggested above, this may secure an efficient process in the exhaust treatment device, e.g. where the latter comprises an SCR catalyst.

In some embodiments, the heat exchanger is a first heat exchanger, and the system further comprises a second heat exchanger arranged to receive the air from the first heat exchanger before it reaches the at least one of the at least one combustor, and to receive the processed exhaust gases from the exhaust treatment device, the second heat exchanger being arranged to allow heat to be exchanged between the air and the exhaust gases. Thereby, the system may allow, during an operation thereof, heat to be transferred in the second heat exchanger from the exhaust gases to the air. Thus, energy in the exhaust gases can be recovered by heating the intake air after the air has delivered heat, by means of the first heat exchanger, to the exhaust treatment device.

The second heat exchanger is preferably a counterflow heat exchanger. However, in some embodiments, the second heat exchanger may be a parallel flow heat exchanger.

Advantageously, the heat exchanger forms a buffer volume for the air.

The air buffer volume reduces or eliminates any requirements of correlation of the actuation timing of compressor outlet valves and combustor inlet valves 403 to avoid losses with pulsating flows. Thanks to the air buffer volume, such valve actuation timing correlation requirements may be relaxed without increasing the risk of pulsating flows. Thereby simpler and cheaper valve control systems may be employed.

Preferably, where the system comprises an expander arranged to receive the exhaust gases from the at least one of the at least one combustor, and to expand and extract energy from the exhaust gases, the system comprises in addition to said exhaust treatment device a pre-expander exhaust treatment device arranged to receive exhaust gases from the at least one of the at least one combustor, to provide an exhaust treatment process to the exhaust gases, and to deliver processed exhaust gases to the expander. The pre-expander exhaust treatment device may comprise an oxidation catalyst, and/or a particulate filter. Where both are provided, the particulate filter may be located downstream of the oxidation catalyst. The system may further be arranged so that during an operation thereof, the pre-expander exhaust treatment device presents a temperature which is considerably higher than the temperature of the exhaust treatment device to which the heat exchanger is arranged to transfer heat from the compressed air. Thereby, an advantageous distribution of exhaust treatment devices along the path of the exhaust gases may be provided, giving different temperatures which are each optimized for the respective exhaust treatment device.

It is understood that depending on the provision of the pre-expander exhaust treatment device, the expander is arranged to receive processed or unprocessed exhaust gases from the combustor. Exhaust gases are herein understood as being processed if they are received from an exhaust treatment device.

The invention is particularly advantageous where the system comprises a crankshaft, and the combustor comprises a piston arranged to reciprocate in a cylinder, and to drive the crankshaft. It is understood that the system may comprise a plurality of combustors, each comprising a piston arranged to reciprocate in a respective cylinder, whereby the piston are all arranged to drive the crankshaft.

Where an expander is provided as exemplified above, the expander is preferably a piston expander arranged to drive the crankshaft with the extracted energy. Similarly, the compressor may be a piston compressor, arranged to be driven by the crankshaft. Thus, the invention may be advantageously implemented in a multistage compression and expansion engine where the compressor(s) and the expanders are connected to the crankshaft. Such a connection may be direct or indirect, as exemplified below. Typically, the expanders may provide 30-50%, e.g. 40%, of the total power of the engine, and the compressor(s) may take 10-20% of the total power of the engine.

The invention may be advantageously implemented as an engine system, where the combustor comprises a fuel injector and is arranged to combust fuel and at least a portion of the received air in a Diesel cycle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples. In the drawings.

DETAILED DESCRIPTION

Figure 1:
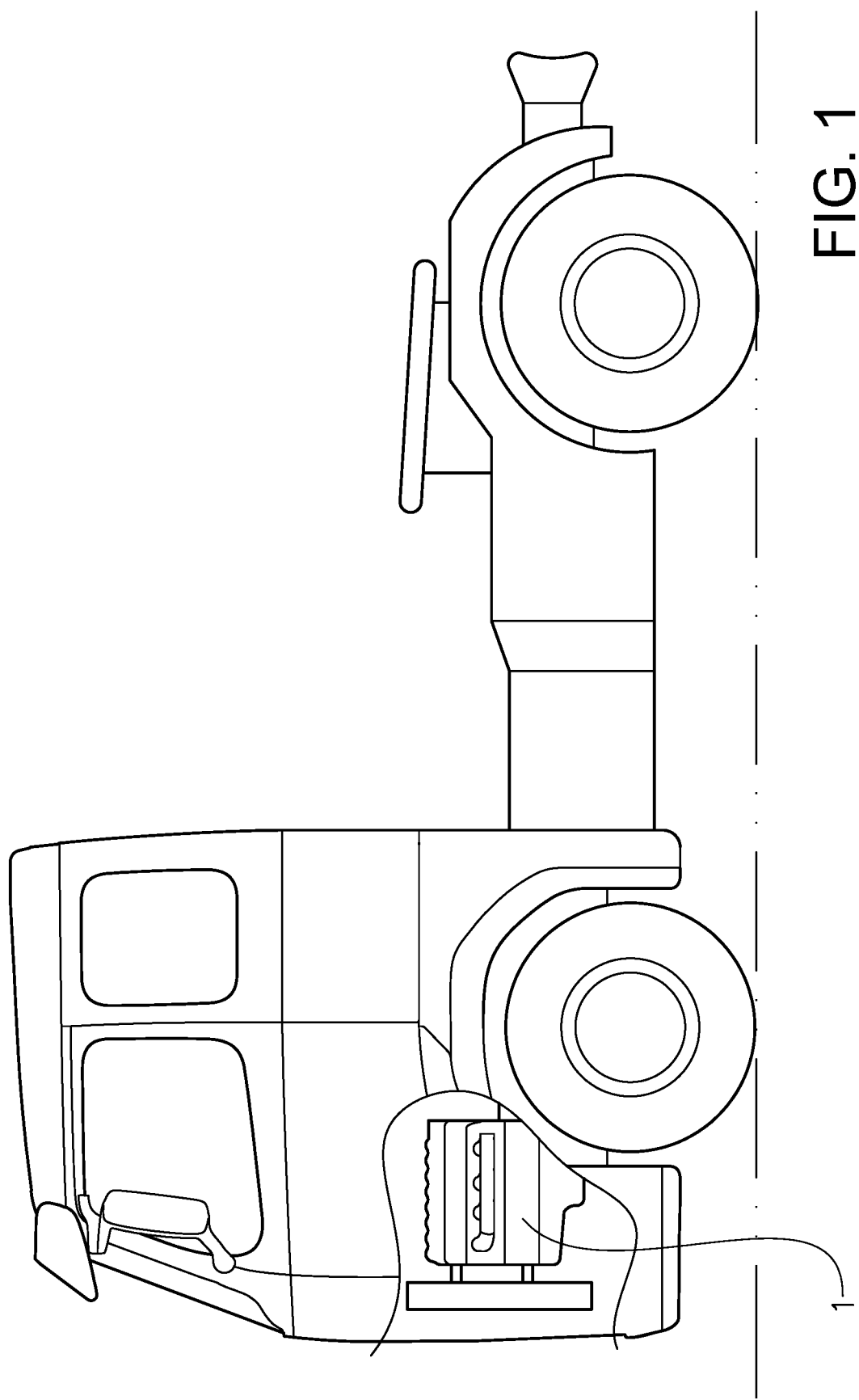
FIG. 1 is a partially sectioned side view of a vehicle in the form of a truck.

FIG. 1 shows a vehicle in the form of a truck, or a tractor for a semitrailer. It should be noted however that the invention is applicable to a variety of alternative types of vehicles, such as a car, a bus, or a working machine such as a wheel loader. The vehicle comprises an internal combustion engine system 1.

Figure 2:
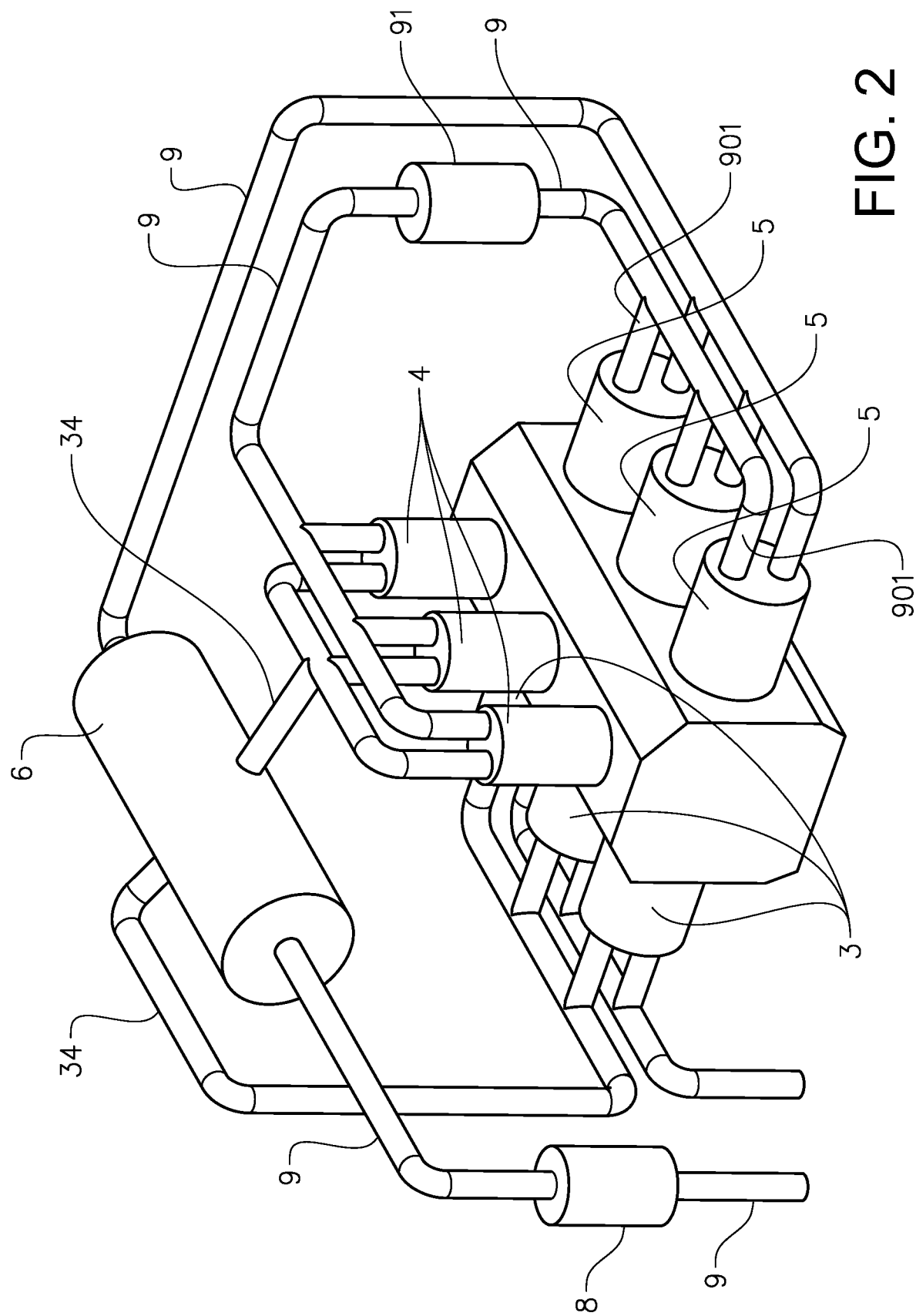
FIG. 2 is a schematic perspective view of an engine system in the vehicle in FIG. 1.

FIG. 2 is schematic and does not show, for simplicity of this presentation, certain parts such as devices for the actuation of inlet and outlet valves in cylinders of the engine system. The engine system 1 comprises a multi-stage compression and expansion internal combustion engine. The engine comprises three combustors 4, in the form of cylinders with pistons, and three piston compressors 3.

The system further comprises an air guide 34 arranged to guide compressed air from the compressors 3 to the combustors 4. The air guide 34 is arranged such that the air therein passes through a heat exchanger 6, described closer below.

The system further comprises three piston expanders 5 arranged to expand exhaust gases from the combustors 4 and to extract energy from the expanded exhaust gases. An exhaust guide 9 is arranged to guide exhaust gases from the combustors 4 to the expanders 5. The exhaust guide 9 comprises a pre-expander exhaust treatment device 91 described closer below. The exhaust guide 9 is further arranged to guide exhaust gases from the expanders 5 to the heat exchanger 6. The exhaust guide 9 is also arranged to guide exhaust gases from the heat exchanger 6 to a post-expander exhaust treatment device 8, described closer below.

It is understood that the engine system may comprise any number of combustors 4, compressors 3, and expanders 5. In this example, the combustors 4, compressors 3, and expanders 5 share a single heat exchanger 6, a single pre-expander exhaust treatment device 91, and a single post-expander exhaust treatment device 8. However, the number of air guides 34, heat exchangers 6, exhaust guides 9, pre-expander exhaust treatment devices 91, and post-expander exhaust treatment devices 8 may vary as well. For example, it is conceivable that a plurality of pairs of air guides 34 and exhaust guides 9 with respective heat exchangers 6 to and from subgroups of the cylinders.

Figure 3:
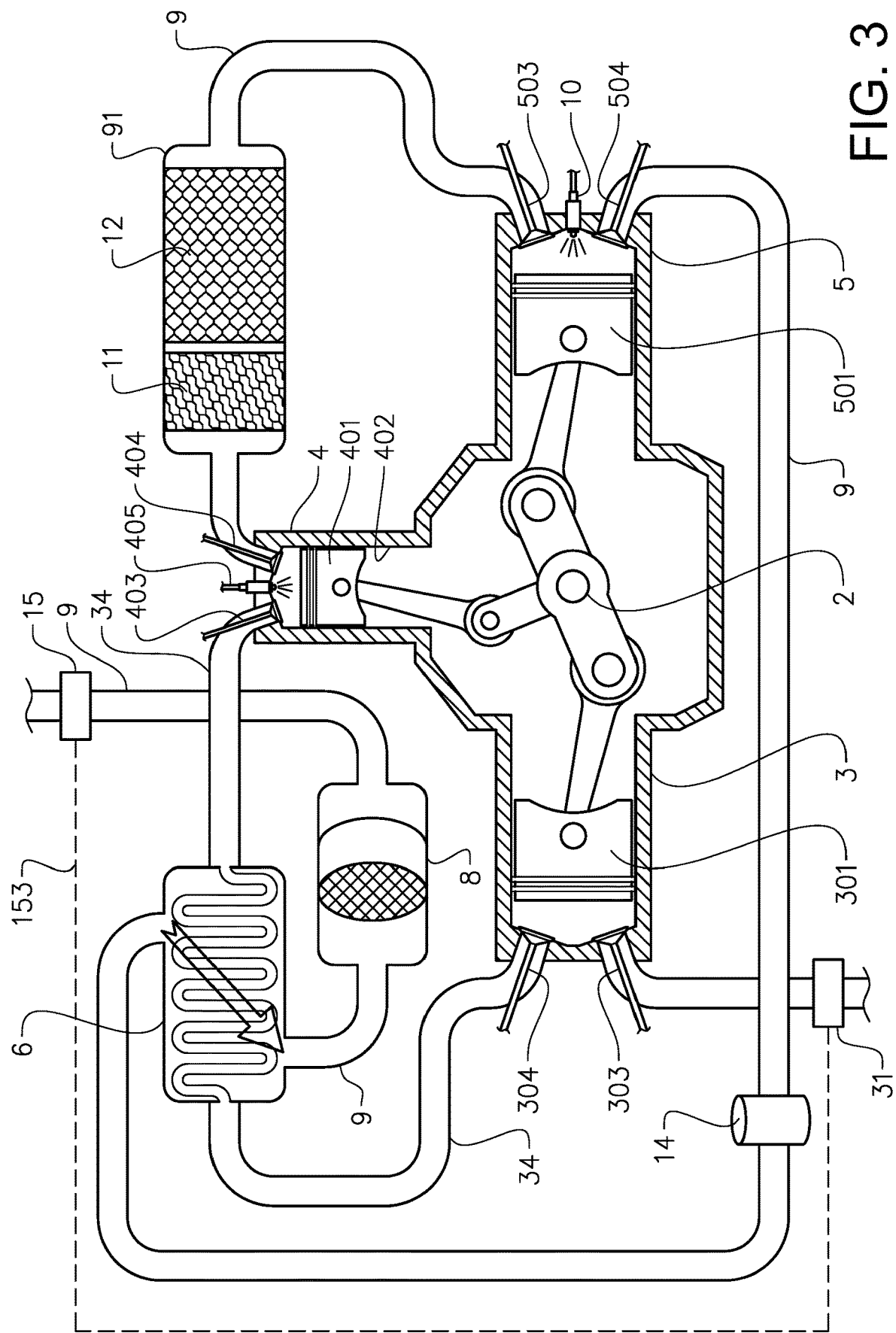
FIG. 3 is a schematic cross-sectional view of the engine system in FIG. 2.

Reference is made to FIG. 3 in which only one of the combustors 4, only one of compressors 3, and only one of the expanders 5 are shown. The piston 401 of each combustor 4 is arranged to reciprocate in the respective cylinder 402, whereby the pistons are all arranged to drive a crankshaft 2 of the engine. For simplicity, the combustor 4, the compressor 3, and the expander 5 are shown as all being located in the same cross-sectional plane; in a real implementation of the embodiment, the combustor 4, the compressor 3, and the expander 5 are preferably offset in relation to each other along the crankshaft 2.

The combustors 4 are provided with respective sets of inlet and outlet valves 403, 404, arranged to be actuated in a manner which may be known per se, e.g. with cams mounted on camshafts, (not shown). The timing and the maximum movements of the valves 403, 404 may also be variable, as is also known per se.

In addition, the combustors 4 are provided with respective fuel injectors 405 for injecting a fuel into the cylinders 402. In this example, the combustors 4 are arranged to provide a Diesel cycle to extract work from the air and fuel provided. However, the invention is equally applicable to engines in which the combustors are arranged to provide an Otto cycle, wherein the engine system may be provided with means for air mass flow control, such as variable inlet and outlet valves 303, 304 of the compressors 3, described further below, for controlling the air supply to the combustors 4. Alternatively, or in addition, the means for air mass flow control may comprise one or more throttles for controlling the air supply to the combustors 4. The engine system may be provided with spark plugs in the combustors.

The pistons 501 of the expanders 5 are arranged to drive the crankshaft 2 with the energy extracted from the exhaust gases from the combustors 4. The expanders 5 are provided with respective sets of inlet and outlet valves 503, 504, arranged to be actuated with cams mounted on camshafts, (not shown). The timing and the maximum movements of the valves 503, 504 may also be variable, as is known per se.

Further, the pistons 301 of the compressors 3 are all arranged to be driven by the crankshaft 2. The compressors 3 are provided with respective sets of said inlet and outlet valves 303, 304, arranged to be actuated with cams mounted on camshafts, (not shown). The timing and the maximum movements of the valves 303, 304 may also be variable, as is known per se.

The pre-expander exhaust treatment device 91 is arranged to provide an exhaust treatment process to the exhaust gases from the combustors 4. The pre-expander exhaust treatment device 91 comprises an oxidation catalyst 11, and a particulate filter 12 located downstream of the oxidation catalyst 11. The pre-expander exhaust treatment device 91 presents in this example a circular cross-section.

The post-expander exhaust treatment device 8 is in this example provided in the form of a selective catalytic reduction (SCR) catalyst. The SCR catalyst 8 is arranged to receive exhaust gases from the expanders 5 and to provide an exhaust treatment process to the received exhaust gases, which process reduces nitrogen oxides (NOx) as is known per se.

Alternatively, the post-expander exhaust treatment device 8 comprises an oxidation catalyst.

The system also comprises three injectors 10 arranged to inject reductant for the SCR catalyst 8. Each injector 10 is arranged to inject the reductant directly into a respective of the expanders 5. The injectors 10 are controllable by a control unit (not shown), to control the timing, the flow and the duration of the redundant injections. Specifically, the timing and duration of the reductant injections are coordinated with the actuations of the expander inlet valves 503, in order to enable good mixing of the reductant with the exhaust gases in the expander. In alternative embodiments, as exemplified below, the injectors 10 are arranged to inject the reductant into the exhaust guide 9, upstream of the expanders 5 and downstream of the pre-expander exhaust treatment device 91.

In alternative embodiments, a single reductant injector may be provided, e.g. where the engine system is provided with a single expander 5 arranged to receive exhaust gases from a plurality of combustors 4. The single reductant injector may be thereby be arranged to inject the reductant upstream of, or into the single expander.

It is understood that the multi-stage compression and expansion internal combustion engine of the system in FIG. 2 and FIG. 3 provides a compression of the air by the compressors 3, and a further compression by the combustors 4. An expansion is provided by the combustors 4, and a further expansion is provided by the expanders 5. The multistage expansion provides a high utilization of the energy in the combustions of the engine. As a result, the exhaust gas temperature downstream of the expanders 5 will be relatively low, e.g. within the range of 50-250° C. This means that the temperature might be too low for the NOx reducing process in the SCR catalyst 8 to be efficient. Such a process may not be possible at all in temperatures below 150° C., and for the process to be fully efficient, the temperature usually have to reach 250° C.

The heat exchanger 6 provides a solution to this problem. The heat exchanger 6 is arranged to receive exhaust gases produced by the combustors 4 and delivered by the expanders 5. The heat exchanger 6 is further arranged to receive compressed air from the compressor 3 before it reaches the combustors 4. The compressed air reaching the heat exchanger 6 may present a temperature of 200-450° C., preferably 260-350° C.

The heat exchanger 6 is arranged for a heat exchange between the compressed air and the exhaust gases. Thereby, the heat exchanger 6 is arranged to transfer heat to the post-expander exhaust treatment device 8 via the exhaust gases. Thus the temperature of the exhaust gases may be increased before reaching the post-expander exhaust treatment device 8 to improve the process therein. The combination of the heat exchanger 6 and the post-expander exhaust treatment device 8 is herein also referred to as an exhaust treatment unit.

In addition to increasing the temperature for said exhaust treatment process, the heat exchanger 6 also forms a buffer volume for the air. The air buffer volume reduces or eliminates any requirements of correlation of the actuation timing of the compressor outlet valves 304 and the combustor inlet valves 403 to avoid losses with pulsating flows. Thanks to the air buffer volume, such valve actuation timing correlation requirements may be relaxed without increasing the risk of pulsating flows. Thereby simpler and cheaper valve control systems may be employed.

It is understood that the air buffer volume of the heat exchanger 6 suitably presents a cross-section which is larger than any lateral cross-section, perpendicular to a local intended air flow direction, of portions of the air guide 34 upstream and downstream of the heat exchanger 6.

The system comprises an oil separator 14 arranged to receive exhaust gases from the expander 5, and to separate oil from the exhaust gases before the exhaust gases reach the heat exchanger 6 and the post-expander exhaust treatment device 8. Thereby, oil introduced to the exhaust gases, e.g. by the expanders 5, will be removed therefrom, avoiding or reducing detrimental effects it may have on the post-expander exhaust treatment device 8.

The expanders 5 in FIG. 3 are herein also referred to as first expanders 5. In addition, the system may comprise one or more second expanders 15 arranged to receive and expand exhaust gases from the post-expander exhaust treatment device 8 and to extract energy from the expanded exhaust gases. The second expander 15, schematically represented in FIG. 3, may be mechanically connected, as indicated in FIG. 3 with a broken line 153, to an additional compressor 31. The additional compressor 31 may be arranged to compress intake air before it reaches the piston compressor 3.

Figure 4:
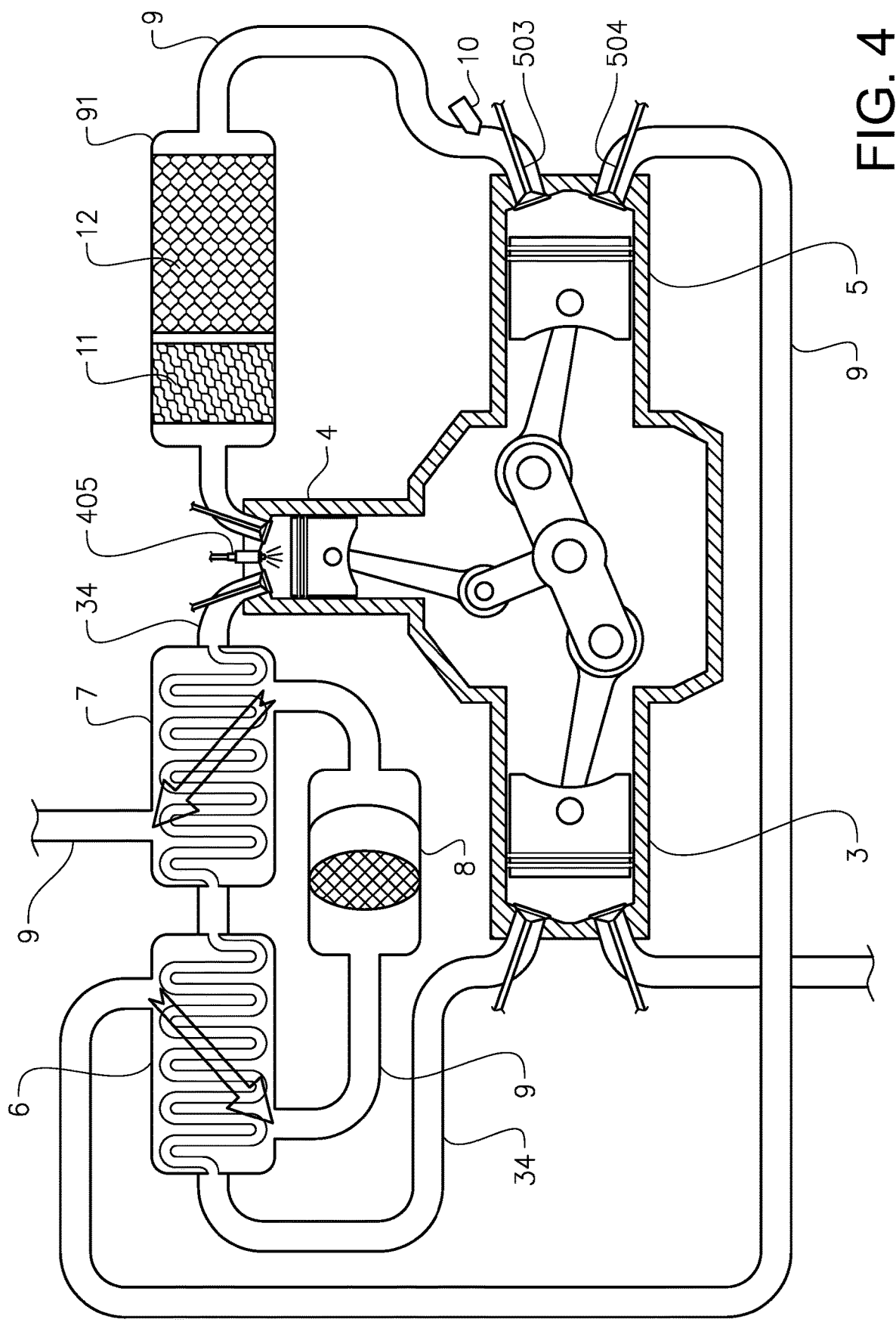
FIG. 4 is a schematic cross-sectional view of an engine system according to an alternative embodiment of the invention.

Reference is made to FIG. 4, showing an engine system according to an alternative embodiment of the invention. This embodiment shares features with the embodiment described with reference to FIG. 2-FIG. 3. However, some further advantageous features are also provided.

The engine system in FIG. 4 comprises a first heat exchanger 6, arranged similarly to the heat exchanger in the engine system in FIG. 3. In addition, the system in FIG. 4 comprises a second heat exchanger 7. The second heat exchanger 7 is provided in the path of the air guide 34, between the first heat exchanger 6 and the combustors 4. Thus, the second heat exchanger 7 is arranged to receive the air from the first heat exchanger 6 before it reaches the combustors 4.

Further, the second heat exchanger 7 is provided in the path of the exhaust guide 9, downstream of the post-expander exhaust treatment device 8, and is thereby arranged to receive the processed exhaust gases from the exhaust treatment device 8. Thus, the second heat exchanger 7 is arranged to allow heat to be exchanged between the air and the exhaust gases. In particular, heat may be transferred in the second heat exchanger 7 from the exhaust gases to the air. Thereby, energy in the exhaust gases can be recovered by heating the intake air after the air has delivered heat, by means of the first heat exchanger 6, to the exhaust gases for the post-expander exhaust treatment device 8.

The system in FIG. 4 also comprises three injectors 10 arranged to inject reductant for the SCR catalyst 8 into the exhaust guide 9, upstream of the expanders 5 and downstream of the pre-expander exhaust treatment device 91. More specifically, each injector 10 is arranged to inject reductant into a respective branch 901 of the exhaust guide 9; see FIG. 2. Each branch 901 is arranged to guide exhaust gases from a non-branched portion of the exhaust guide to a respective of the expanders 5. The injectors 10 are controllable by a control unit (not shown), to control the timing, the flow and the duration of the redundant injections. Specifically, the timing and duration of the reductant injections of each injector 10 are coordinated with the actuations of the respective expander inlet valve 503, in order to enable good mixing of the reductant with the exhaust gases in the respective expander 5.

Figure 5:
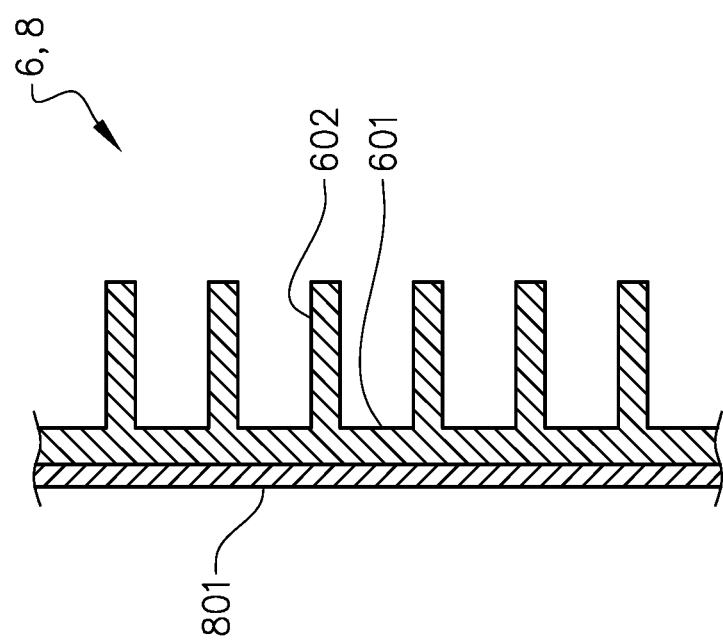
FIG. 5 shows a cross-section of a part of an engine system according to a further alternative embodiment of the invention.

Reference is made to FIG. 5 presenting a detail of a further embodiment of the invention. In the embodiments in FIG. 3 and FIG. 5, the (first) heat exchanger 6 is arranged to transfer the heat to the post-expander exhaust treatment device 8 via the exhaust gases. As an alternative, the heat may be transferred in a more direct manner. In the example in FIG. 5, the heat exchanger 6 and the post-expander exhaust treatment device 8 are integrated.

The heat exchanger 6 comprises a wall 601 separating the air and the exhaust gases. It is understood that the heat exchanger preferably comprises a plurality of such walls, e.g. arranged in parallel with each other. Such a plurality of walls may define alternating cavities for the air and cavities for the exhaust gases.

The post-expander exhaust treatment device 8 comprises an exhaust treatment layer 801 on an exhaust gas side of the wall 601, i.e. on a side of the wall facing a cavity arranged to house the exhaust gases. The exhaust treatment layer 801 is preferably a catalyst. Thus, an exhaust gas part of the heat exchanger 6 is in this example coated with a catalyst. This integration which reduces the total volume of the combination of the heat exchanger 6 and the post-expander exhaust treatment device 8. Also, the integration enhances the heat transfer, and therefore serves to reduce the time to a "working catalyst" during a cold start procedure of the engine system.

It should be noted that in addition to the integrated catalyst 801, the post-expander exhaust treatment device 8 may also present a portion which is arranged to receive the heat from the heat exchanger 6 via the exhaust gases, e.g. by being located downstream of the heat exchanger as in FIG. 3.

As can be seen in FIG. 5, said wall 601 of the heat exchanger 6 presents a plurality of protruding flanges 602 on an air side of the wall 601, i.e. on a side of the wall facing a cavity arranged to house the air. Such flanges 602 will enhance the absorption of the wall 601 of heat from the compressed air, for transfer of the heat to the exhaust treatment layer 801.

In the embodiments described with reference to FIG. 2-FIG. 4, the pistons of the compressors 3 and the expanders 5 are directly connected to the crankshaft 2 via respective connecting rods. In alternative embodiments, the pistons of the compressors 3 and the expanders 5 may be indirectly connected to the crankshaft 2, e.g. via an additional crankshaft and a chain, belt or gear connection between the crankshafts.

It is to be understood that the present invention is not limited to the embodiments described above and illustrated in the drawings; rather, the skilled person will recognize that many changes and modifications may be made within the scope of the appended claims.

The invention claimed is:

1. An internal combustion engine system comprising a compressor arranged to compress air, and at least one combustor, at least one of the at least one combustor being arranged to receive the compressed air,
a heat exchanger arranged to receive the compressed air from the compressor before the compressed air reaches the at least one of the at least one combustor,
an exhaust treatment device arranged to process exhaust gases produced by at least one of the at least one combustor, and
wherein the system comprises an expander arranged to receive the exhaust gases from the at least one of the at least one combustor, and to expand and extract energy from the exhaust gases, the exhaust treatment device being arranged to receive the exhaust gases from the expander, the heat exchanger is arranged to receive the exhaust gases from the expander, the heat exchanger is arranged to transfer heat from the compressed air to the exhaust treatment device, whereby the temperature of the exhaust treatment device is increased to improve the process therein.

2. The system according to claim 1, wherein the expander comprises a piston.

3. The system according to claim 1, wherein the system comprises a crankshaft, and that the expander is arranged to drive the crankshaft.

4. The system according to claim 1, wherein the system comprises an oil separator arranged to receive exhaust gases from the expander, and to separate oil from the exhaust gases before the exhaust gases reach the exhaust treatment device.

5. The system according to claim 1, wherein the heat exchanger is arranged to transfer the heat to the exhaust treatment device via the exhaust gases.

6. The system according to claim 1, wherein the heat exchanger and the exhaust treatment device are integrated.

7. The system according to claim 6, wherein the heat exchanger comprises a wall separating the air and the exhaust gases, and that the exhaust treatment device comprises an exhaust treatment layer on an exhaust gas side of the wall.

8. The system according to claim 7, wherein the wall of the heat exchanger presents a plurality of protruding flanges on an air side of the wall.

9. The system according to claim 1, wherein the exhaust treatment device comprises a first portion which is integrated with the heat exchanger and a second portion which is arranged to receive heat from the compressed air via exhaust gases received from the heat exchanger.

10. The system according to claim 1, wherein the exhaust treatment device comprises an oxidation catalyst.

11. The system according to claim 1, wherein the exhaust treatment device comprises a selective catalytic reduction (SCR) catalyst.

12. The system according to claim 11, wherein the system comprises an injector arranged to inject reductant for the SCR catalyst, upstream of the heat exchanger.

13. The system according to claim 11, wherein the system comprises the expander arranged to receive the exhaust gases from the at least one of the at least one combustor, and to expand and extract energy from the exhaust gases, the exhaust treatment device being arranged to receive the exhaust gases from the expander, and that the system comprises an injector arranged to inject the reductant for the SCR catalyst, upstream of the expander or into the expander.

14. The system according to claim 1, wherein the heat exchanger is a first heat exchanger, the system further comprising a second heat exchanger arranged to receive the air from the first heat exchanger before the air reaches the at least one of the at least one combustor, and to receive the processed exhaust gases from the exhaust treatment device, the second heat exchanger being arranged to allow heat to be exchanged between the air and the exhaust gases.

15. The system according to claim 1, wherein the heat exchanger forms a buffer volume for the air.

16. The system according to claim 1, wherein the system comprises the expander arranged to receive the exhaust gases from the at least one of the at least one combustor, and to expand and extract energy from the exhaust gases, and that the system comprises in addition to the exhaust treatment device a pre-expander exhaust treatment device arranged to receive exhaust gases from the at least one of the at least one combustor, to provide an exhaust treatment process to the exhaust gases, and to deliver processed exhaust gases to the expander.

17. The system according to claim 16, wherein the pre-expander exhaust treatment device comprises an oxidation catalyst.

18. The system according to claim 16, wherein the pre-expander exhaust treatment device comprises a particulate filter.

19. The system according to claims 17, wherein the pre-expander exhaust treatment device comprises a particulate filter and the particulate filter is located downstream of the oxidation catalyst.

20. The system according to claim 1, wherein the system comprises a crankshaft, and that the combustor comprises a piston arranged to reciprocate in a cylinder, and to drive the crankshaft.

21. The system according to claim 1, wherein the compressor comprises a piston.

22. The system according to claim 1, wherein the system comprises a crankshaft, and that the compressor is arranged to be driven by the crankshaft.

23. The system according to claim 1, wherein the combustor comprises a fuel injector and is arranged to combust fuel and at least a portion of the compressed air in a Diesel cycle.

24. The vehicle provided with an internal combustion engine system according to claim 1.

* * * * *